United States Patent [19]

Resconi et al.

[11] Patent Number: 5,585,448

[45] Date of Patent: Dec. 17, 1996

[54] PROCESS FOR THE PREPARATION OF ETHYLENE POLYMERS AND PRODUCTS OBTAINED THEREFROM

[75] Inventors: Luigi Resconi, Ferrara; Fabrizio Piemontesi, Borgosesia; Maurizio Galimberti, Milan, all of Italy

[73] Assignee: Montell Technology Company b.v., Netherlands

[21] Appl. No.: 304,379

[22] Filed: Sep. 12, 1994

[30] Foreign Application Priority Data

Sep. 13, 1993 [IT] Italy .................... MI93A1960

[51] Int. Cl.$^6$ .................... C08F 4/643

[52] U.S. Cl. .................... 526/170; 526/126; 526/127; 526/134; 526/160; 526/348; 526/352; 526/348.6; 526/336; 526/335; 526/943

[58] Field of Search .................... 526/126, 127, 526/134, 160, 170

[56] References Cited

U.S. PATENT DOCUMENTS

| | | | |
|---|---|---|---|
| 5,017,714 | 5/1991 | Welborn, Jr. .................... | 556/12 |
| 5,086,134 | 2/1992 | Antberg et al. .................... | 526/116 |
| 5,145,819 | 9/1992 | Winter et al. .................... | 502/117 |
| 5,229,478 | 7/1993 | Floyd et al. .................... | 526/160 |
| 5,324,801 | 6/1994 | Brekner et al. .................... | 526/160 |
| 5,328,969 | 7/1994 | Winter et al. .................... | 526/127 |
| 5,329,033 | 7/1994 | Spaleck et al. .................... | 556/53 |
| 5,436,305 | 7/1995 | Alt et al. .................... | 526/160 |

FOREIGN PATENT DOCUMENTS

| | | |
|---|---|---|
| 0243127 | 10/1987 | European Pat. Off. . |
| 0275925 | 7/1988 | European Pat. Off. . |
| 0347129 | 12/1989 | European Pat. Off. . |
| 0407870 | 1/1991 | European Pat. Off. . |
| 0501370 | 9/1992 | European Pat. Off. . |
| 0537686 | 4/1993 | European Pat. Off. . |
| 0552945 | 7/1993 | European Pat. Off. . |
| 0584609 | 3/1994 | European Pat. Off. . |
| 0633272 | 1/1995 | European Pat. Off. . |
| WO91/02012 | 2/1991 | WIPO . |
| WO92/00333 | 1/1992 | WIPO . |

OTHER PUBLICATIONS

"X-Ray Structure of ethylenebis(tetrahydroindenyl)-titanium and -zirconium dichlorides: a revision," Collins, et al., *Journal of Organic Chemistry*, vol. 342, pp. 21–29 (1988).

Chemical Abstract, vol. 115, No. 8 72280g, Collins, et al. (1991).

European Search Report for EP 94 11 3359.

Organometallics, 1990, 9,3098 p. 25.

Derwent Abstract and Family Search for EP 0407870.

Derwent Abstract and Family Search for EP 0501370.

*Primary Examiner*—Mark Nagumo
*Attorney, Agent, or Firm*—Bryan Cave LLP

[57] ABSTRACT

Homo- and copolymers of ethylene endowed with very high molecular weights and narrow molecular weight distributions are obtainable by carrying out the polymerization reaction in the presence of a metallocene-based catalyst wherein the metallocene is stereorigid and it is in its meso isomeric form.

10 Claims, No Drawings

PROCESS FOR THE PREPARATION OF ETHYLENE POLYMERS AND PRODUCTS OBTAINED THEREFROM

BACKGROUND OF THE INVENTION

1. Field of the Invention

The present invention relates to a process for the preparation of olefin polymers. In particular, it relates to a process for the preparation of ethylene homo- and copolymers having very high molecular weights and narrow molecular weight distributions.

2. Description of the Prior Art

It is known that the properties of ethylene homopolymers and of copolymers of ethylene with one or more alpha-olefin comonomers depend on their molecular weight. The use of these polymers in fields such as, for example, the production of films, generally requires that they be endowed with high molecular weights.

The above mentioned ethylene polymers are generally prepared in the presence of catalysts of Ziegler-Natta type. The polymer thus obtained have a wide molecular weight distribution.

More recently, in processes for the preparation of polymers of ethylene, homogeneous catalysts based on metallocene compounds have been used. The polymers obtained by working in the presence of these catalysts, have a narrow molecular weight distribution, but their molecular weights are not always industrially acceptable.

Only when working under particular conditions and in the presence of particular metallocene catalysts such as, for example, metallocene compounds of hafnium, it is possible to obtain ethylene polymers having higher molecular weights.

In the international patent application WO 91/02012, for example, there is described a process for the preparation of high density linear polyethylene having high molecular weight and narrow molecular weight distribution, in the presence of bis(cyclopentadienyl)hafnium compounds and a tetrakis(pentafluorophenyl)borate salt. However, in this application only the preparation of ethylene homopolymers is exemplified.

Metallocene compounds wherein the ligands consist of two substituted cyclopentadienyls linked between them by a bridging group which gives steric rigidity to the molecule, are known to be stereospecific catalyst components for the preparation of isotactic polyolefins. These metallocenes can exist in two sterical configurations, that is the racemic and the meso isomeric form. As the chiral racemic form only is stereospecific, the meso form is generally removed by separation from the rac/meso mixtures obtained from the metallocene synthesis.

SUMMARY OF THE INVENTION

It has now been surprisingly found that it is possible to prepare homo- and copolymers of ethylene having very high molecular weights as well as narrow molecular weight distributions if the polymerization reaction is carried out in the presence of a metallocene-based catalyst wherein the metallocene is stereorigid and it is in its meso isomeric form.

Therefore, an object of the present invention is a process for the preparation of an ethylene polymer, which comprises the polymerization reaction of ethylene in the presence of a catalyst comprising a stereorigid metallocene compound of a transition metal belonging to the Group IIIb, IVb, Vb, VIb or of Lanthanides of the Periodic Table of the Elements, having two substituted cyclopentadienyl ligands bridge joined between them, characterized in that the metallocene compound is substantially in its meso isomeric form.

Another object of the present invention is an elastomeric copolymer of ethylene with propylene and, optionally, with at least one polyene, obtainable with the process of the invention.

Still another object of the present invention is an elastomeric copolymer of ethylene with 1-butene and, optionally, with at least one polyene, obtainable with the process of the invention.

A further object of the present invention is an elastomeric copolymer of ethylene with at least one $\alpha$-olefin $C_3$–$C_{12}$ and, optionally, with at least one polyene, endowed with very high molecular weight.

Still a further object of the present invention is a stereorigid metallocene compound having two substituted cyclopentadienyl ligands bridge joined between them, characterized in that it is substantially in its meso isomeric form.

DESCRIPTION OF THE PREFERRED EMBODIMENTS

Stereorigid metallocene compounds which can be used in the process of the present invention are those of the formula (I):

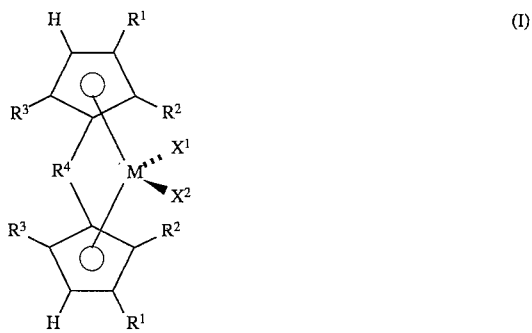

wherein

M is a metal selected from Ti, Zr and Hf;

$R^1$, same or different, are $C_1$–$C_{20}$ alkyl radicals, $C_3$–$C_{20}$ cycloalkyl radicals, $C_2$–$C_{20}$ alkenyl radicals, $C_6$–$C_{20}$ aryl radicals, $C_7$–$C_{20}$ alkylaryl radicals or $C_7$–$C_{20}$ arylalkyl radicals and can contain Si or Ge atoms;

$R^2$ and $R^3$, same or different, are hydrogen atoms, $C_1$–$C_{20}$ alkyl radicals, $C_3$–$C_{20}$ cycloalkyl radicals, $C_2$–$C_{20}$ alkenyl radicals, $C_6$–$C_{20}$ aryl radicals, $C_7$–$C_{20}$ alkylaryl radicals or $C_7$–$C_{20}$ arylalkyl radicals and can contain Si or Ge atoms;

$R^4$ is a divalent group selected from $(CR^5{}_2)_n$, $(SiR^5{}_2)_n$, $(GeR^5{}_2)_n$, $NR^5$ or $PR^5$, wherein $R^5$, same or different, are $C_1$–$C_{20}$ alkyl radicals, $C_3$–$C_{20}$ cycloalkyl radicals, $C_2$–$C_{20}$ alkenyl radicals, $C_6$–$C_{20}$ aryl radicals, $C_7$–$C_{20}$ alkylaryl radicals or $C_7$–$C_{20}$ arylalkyl radicals, and when $R^4$ is $(CR^5{}_2)_n$, $(SiR^5{}_2)_n$, $(GeR^5{}_2)_n$, two substituents $R^5$ on the same carbon, silicon or germanium atom can form a cycle comprising from 3 to 8 atoms;

n is an integer comprised between 1 and 4, preferably being 1 or 2, $X^1$ and $X^2$, same or different, are hydrogen atoms, halogen atoms, $R^6$, $OR^6$, $SR^6$, $NR^6{}_2$ or $PR^6{}_2$, wherein substituents $R^6$, same or different from each other, are $C_1$–$C_{20}$ alkyl radicals, $C_3$–$C_{20}$ cycloalkyl radicals, $C_2$–$C_{20}$ alkenyl radicals, $C_6$–$C_{20}$ aryl radicals, $C_7$–$C_{20}$ alkylaryl radicals or $C_7$–$C_{20}$ arylalkyl radicals and can contain Si or Ge atoms;

and wherein $R^1$ and $R^2$ on the same cyclopentadienyl ligand can form a cycle comprising from 5 to 8 carbon atoms.

Metallocene compounds particulary suitable for use in the process according to the present invention are the bridged bis-indenyls of the formula (II):

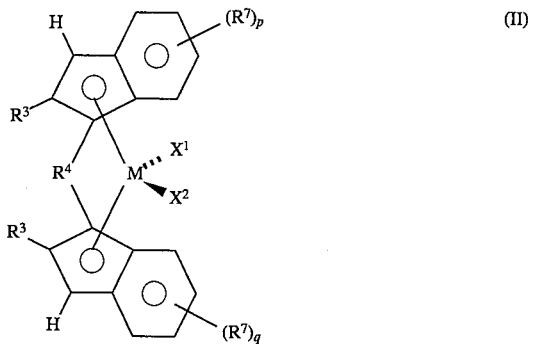

and the bridged bis-tetrahydroindenyls of the formula (III):

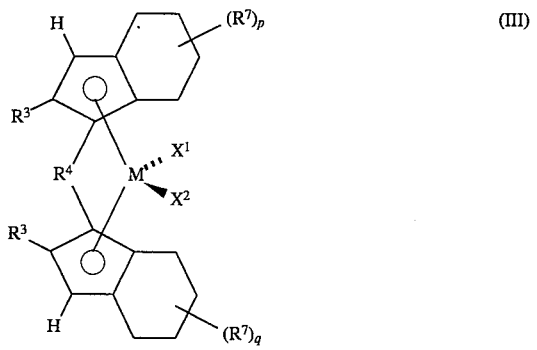

wherein

M, $R^3$, $R^4$, $X^1$ and $X^2$ are defined as above;

$R^7$ same or different, are hydrogen atoms, $C_1$–$C_{10}$ alkyl radicals, $C_3$–$C_{10}$ cycloalkyl radicals, $C_2$–$C_{10}$ alkenyl radicals, $C_6$–$C_{10}$ alkylaryl radicals or $C_7$–$C_{10}$ arylalkyl radicals and can contain Si or Ge atoms;

p and q, same or different, are integers comprised between 1 and 4;

and wherein two adjacent substituents $R^7$ on the same ligand can form a cycle comprising from 5 to 8 carbon atoms.

Metallocene compounds of the formula (II) or (III) particulary suitable are those wherein M is Zr, $R^3$ are hydrogen atoms, methyl or ethyl groups, $R^7$ are hydrogen atoms or methyl groups, $X^1$ and $X^2$ are chlorine or methyl groups and $R^4$ is a ethylidene or dimethyl-silyl divalent radical.

Non limitative examples of metallocenes suitable for the use in the process according to the present invention are:

meso-$C_2H_4(Ind)_2MCl_2$ meso-$C_2H_4(Ind)_2MMe_2$
meso-$C_2H_4(Ind)_2M(NMe_2)_2$ meso-$C_2H_4(H_4Ind)_2MCl_2$
meso-$C_2H_4(H_4Ind)_2MMe_2$ meso-$C_2H_4(H_4Ind)_2M(NMe_2)OMe$
meso-$Me_2Si(Ind)_2MCl_2$ meso-$Me_2Si(Ind)_2MMe_2$
meso-$Ph(Me)Si(Ind)_2MCl_2$ meso-$Ph_2Si(Ind)_2MCl_2$
meso-$C_2Me_4(Ind)_2MCl_2$ meso-$Me_2SiCH_2(Ind)_2MCl_2$
meso-$C_2H_4(2\text{-}MeInd)_2MCl_2$ meso-$C_2H_4(4,7\text{-}Me_2Ind)_2MCl_2$
meso-$C_2H_4(5,6\text{-}Me_2Ind)_2MCl_2$ meso-$C_2H_4(2,4,7\text{-}Me_3Ind)_2MCl_2$
meso-$C_2H_4(2\text{-}MeH_4Ind)_2MCl_2$ meso-$C_2H_4(4,7\text{-}Me_2H_4Ind)_2MCl_2$
meso-$C_2H_4(2,4,7\text{-}Me_3H_4Ind)_2MCl_2$ meso-$Me_2Si(2\text{-}MeInd)_2MCl_2$
meso-$Me_2Si(4,7\text{-}Me_2Ind)_2MCl_2$ meso-$Me_2Si(5,6\text{-}Me_2Ind)_2MCl$
meso-$Me_2Si(2,4,7\text{-}Me_3Ind)_2MCl_2$ meso-$Me_2Si(2\text{-}MeH_4Ind)_2MCl_2$
meso-$Me_2Si(4,7\text{-}Me_2H_4Ind)_2MCl_2$ meso-$Me_2Si(2,4,7\text{-}Me_3H_4Ind)_2MCl_2$ wherein Me=methyl, Ph=phenyl, Cp=cyclopentadienyl, Ind=indenyl, $H_4Ind$=4,5,6,7-tetrahydroindenyl, M can be Ti, Zr or Hf, preferably it is Zr.

The meso isomeric form of metallocene compounds useable in the process of the invention can be separated from the corresponding racemic form by the common separation methods such as, for example, fractionated crystallization and extraction with solvents.

A particulary preferred metallocene compounds for use in the process according to the present invention is the meso-ethylene-bis(4,7-dimethyl-1-indenyl)zirconium dichloride. In fact, the separation of the racemic and meso isomers is particulary simplified, because of the remarkable difference of solubility of the two isomers in solvents such as, for example, $CH_2Cl_2$, toluene or dimethoxy ethane.

The process for the preparation of ethylene polymers according to the present invention is generally carried out in the presence, as cocatalyst, of one or more organometallic compounds of aluminum, or of one or more compounds able to form a metallocene alkyl cation. In the case of metallocenes of metals of the Group III or of the Lanthanides of the Periodic Table of Elements, it is possible to carry out the polymerization reaction in the absence of cocatalyst.

The molar ratio between the aluminum and the metal of the metallocene compound is generally comprised between about 10:1 and about 10000:1, and preferably between about 100:1 and about 5000:1.

Organometallic compounds of aluminum useable in the process according to the invention are, for example, the linear, branched or cyclic alumoxanes, containing at least one group of the type (IV):

wherein $R^8$, same or different, are $R^9$ or a group —O—Al($R^8$)$_2$ and, optionally, some $R^8$ can be halogen atoms, $R^9$ being defined as $R^1$.

In particular, alumoxanes which can be suitably used as cocatalysts in the process of the present invention are those of the formula (V):

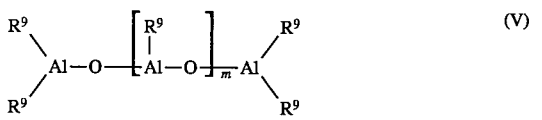

for linear compounds, and those of the formula (VI):

for cyclic compounds, wherein m is 0 or an integer comprised between 1 and 40, being an integer comprised between 2 and 40 in the case of cyclic compounds.

Non limitative examples of alumoxanes suitable for use as cocatalysts in the process of the present invention are those in which the $R^9$ groups are selected among methyl, ethyl and isobutyl radicals, particularly methylalumoxane (MAO) and isobutylalumoxane (TIBAO).

The alumoxanes usable in the process of the present invention can be obtained by reacting aluminum alkyls or aluminum alkyl-hydrides with water. Non limitative examples of useable aluminum alkyls or alkyl-hydrides are:

$Al(Me)_3$, $Al(Et)_3$, $AlH(Et)_2$, $Al(iBu)_3$, $AlH(iBu)_2$, $Al(i-Hex)_3$, $Al(C_6H_5)_3$, $Al(CH_2C_6H_5)_3$, $Al(CH_2CMe_3)_3$, $Al(CH_2SiMe_3)_3$, $Al(Me)_2iBu$, $Al(Me)_2Et$, $AlMe(Et)_2$, $AlMe(iBu)_2$, $Al(Me)_2iBu$, $Al(Me)_2Cl$, $Al(Et)_2Cl$, $AlEtCl_2$, $Al_2(Et)_3Cl_3$, wherein Me=methyl, Et=ethyl, iBu=isobutyl, iHex=isohexyl. The trimethyl aluminum (TMA) and the triisobutylaluminum (TIBAL) are preferred.

A particular class of organo-metallic compounds of aluminum useable as cocatalysts in the process according to the invention is that of compounds obtainable by reaction of aluminium alkyls or alkylhydrides with water in molar ratio comprised between 1:1 and 100:1 respectively. Compounds of this type are described in European patent application EP-575 875, the content of which is incorporated in the present description.

Moreover, organometallic compounds of aluminum useable as cocatalysts in the process of the invention are those of the formula (VII):

and those of the formula (VIII):

wherein $R^9$ is defined as above.

Non limitative examples of compounds able to form a metallocene alkyl cation are compounds of the formula $Y^+Z^-$, wherein $Y^+$ is a Brönsted's acid, able to give a proton and to react irreversibly with a substituent $X^1$ or $X^2$ of the compound of the formula (I) and $Z^-$ is a compatible anion, which does not coordinate, able to stabilize the active catalytic species which is sufficiently labile to be shifted from an olefinic substrate. Preferably, the anion $Z^-$ comprises one or more boron atoms. More preferably, the anion $Z^-$ is an anion of the formula $BAr_4$, wherein the substituents Ar, same or different from each other are aryl radicals such as phenyl, pentafluorophenyl, bis(trifluoromethyl)phenyl. Particulary preferred is the tetrakis-pentafluorophenyl-borate. Furthermore, compounds of the formula $BAr_3$ can be suitably used. Compounds of this type are described for example in the Published International Patent Application WP 92/00333, the content of which is incorporated in the present description.

The catalysts used in the process of the present invention can be also used on inert supports. This can be obtained by deposing the metallocene compound (A), or the product of the reaction of the same with the component (B), or the component (B) and subsequently the metallocene compound (A), on inert supports such as for example silica, alumina, styrene-divinylbenzene copolymers or polyethylene.

A particular class of inert supports suitable for the use according to the present invention are the porous organic supports functionalized with groups having active hydrogen atoms, which are described in the European Patent Application No. 94110168.5. Particularly preferred are those wherein the organic support is a partially crosslinked styrenic polymer.

The thus obtained solid compound, in combination with a further addition of the aluminum alkyl compound either as such or pre-reacted with water, can be used in the gas phase polymerization processes.

The process for the ethylene polymerization according to the present invention can also be carried out in liquid phase, preferably in the presence of an inert hydrocarbon solvent which can be aromatic such as, for example, toluene, or aliphatic such as, for example, n-hexane.

The polymerization temperature is generally comprised between 0° C. and 150° C. in particular between 20° C. and 100° C., and more particulary between 30° C. and 80° C.

The molecular weight of the polymers obtained can be remarkably high. In particular, polymers can be obtained with $M_v$ higher than $1.10^6$ and preferably, comprised between $2.10^6$ and $6.10^6$.

The molecular weight of the polymers can be varied merely by varying the polymerization temperature, the type or the concentration of the catalytic components or by using molecular weight regulators such as, for example, hydrogen.

The polymers of the invention are endowed with a narrow molecular weight distribution. An index of the molecular weight distribution is represented by the ratio $M_w/M_n$ which, for the copolymer of the invention, is generally lower than 4, preferably lower than 3.5 and, more preferably, lower than 3.

The molecular weight distribution can be varied by using mixtures of different metallocene compounds, or by carrying out the polymerization in many steps differing as to the polymerization temperatures and/or the concentrations of the molecular weight regulator.

The polymerization yields depend on the purity of the metallocene components of the catalyst. Therefore, the metallocene compounds can be used either as such, or they can be subjected to purification treatments.

The components of the catalyst can be contacted among them before the polymerization. The contact time is generally comprised between 1 and 60 minutes, preferably between 5 and 20 minutes.

According to another embodiment of the present invention, the process for the preparation of ethylene polymers can be carried out in the presence of one or more olefins selected from the alpha-olefins of the formula (IX):

$$CH_2=CH-R \qquad (IX)$$

wherein R is an alkyl radical containing from 1 to 20 carbon atoms, and the cycloolefins.

The obtainable copolymers are characterized by valuable properties, such as the low content of ashes and the uniformity of distribution of the comonomers in the copolymeric chain.

In particular, LLDPE copolymers can be prepared, having a content of comonomer units comprised between 1 and 20% by moles, preferably between 5 and 15% by moles, density comprised between 0.87 and 0.95 $g/cm^3$ and characterized by an uniform distribution of the comonomer along the polymeric chain.

Non limitative examples of olefins useable as comonomers are propylene, 1-butene, 1-pentene, 4-methyl-1-pentene, 1-hexene, 1-octene, 1-decene, 1-dodecene, 1-tetracene, 1-hexadecene, 1-octadecene, 1-eicosene, allylcyclohexane, cyclopentene, cyclohexene, norbornene, 4,6-dimethyl-1-heptene, allyl-trimethyl-silane.

The above mentioned copolymers can also contain units deriving from polyenes, in particular from conjugated or not conjugated, linear or cyclic dienes, such as for example 1,4-hexadiene, isoprene, 1,3-butadiene, 1,5-hexadiene, 1,6-heptadiene.

Furthermore, the process of the present invention can be advantageously used for the preparation of elastomeric copolymers of ethylene with alpha-olefins of the formula (IX):

$$CH_2=CH-R \qquad (IX)$$

wherein R is an alkyl radical containing from 1 to 10 carbon atoms, optionally containing lower proportions of units deriving from a polyene.

The saturated elastomeric copolymers have a content of ethylene units comprised between 15% and 85% by moles, preferably between 40% and 80% by moles, more preferably between 55% and 75% by moles, the complement to 100 being constituted by units of one or more alpha-olefins and/or of a non conjugated diolefin able to cyclopolymerize.

The unsaturated elastomeric copolymers contain, besides the units deriving from the polymerization of ethylene and alpha-olefins, also lower proportions of unsaturated units deriving from the copolymerization of one or more polyenes. The content of unsaturated units can vary from 0.1 to 5% by moles, preferably it is comprised between 0.2 and 3% by moles.

Non limitative examples of alpha-olefins useable as comonomers in the elastomeric copolymers of ethylene are propylene, 1-butene, 1-hexene, 4-methyl-1-pentene.

Non limitative examples of non-conjugated diolefins able to cyclopolymerize useable as comonomers in the elastomeric copolymers of ethylene are 1,5-hexadiene, 1,6-heptadiene, 2-methyl-1,5-hexadiene.

Non limitative examples of polyenes useable as comonomers in the elastomeric copolymers of ethylene are:

polyenes able to give unsaturated units, such as non conjugated linear dienes such as 1,4-hexadiene trans, 1,4-hexadiene cis, 6-methyl-1,5-heptadiene, 3,7-dimethyl-1,6-octadiene, 11-methyl-1,10-dodecadiene;

monocyclic diolefins such as for example cis-1,5-cyclooctadiene and 5-methyl-1,5-cyclooctadiene;

bicyclic diolefins such as 4,5,8,9-tetrahydroindene and 6 and/or 7-methyl-4,5,8,9-tetrahydroindene;

alkenyl or alkyliden norbornenes such as, for example, 5-ethyliden-2-norbornene, 5-isopropyliden-2-norbornene, exo-5-isopropenyl-2-norbornene;

polycyclic diolefins such as, for example, dicyclopentadiene, tricyclo-[6.2.1.0$^{2,7}$]4,9-undecadiene and the 4-methyl derivative thereof;

non conjugated diolefins able to cyclopolymerize, such as 1,5-hexadiene, 1,6-heptadiene, 2-methyl-1,5-hexadiene;

conjugated dienes such as butadiene and isoprene.

In particular, by the process of the present invention it is possible to prepare elastomeric copolymers of ethylene with propylene and, optionally, one or more polyenes, having content of units deriving from ethylene comprised between about 35% and 85% by moles, content of units deriving from propylene comprised between about 10% and 60% by moles and content of units deriving from one or more polyenes comprised between 0 and 5% by moles, having the following characteristics:

content of propylene units in form of triads comprised between 0 and 8%, preferably between 0.5% and 6% and, more preferably, between 1% and 4%;

less than 50%, preferably less than 45%, of the above mentioned propylene triads having isotactic structure;

product of the reactivity ratios $r_1 \cdot r_2$ lower than 0.5, preferably comprised between 0.1 and 0.45 and, more preferably, comprised between 0.3 and 0.4.

The content by moles of monomeric units deriving from ethylene is preferably comprised between about 50% and 80% and, more preferably, between about 60% and 75%.

The content by moles of monomeric units deriving from propylene is preferably comprised between about 15% and 50% and, more preferably, between about 20% and 40%.

The content by moles of monomeric units deriving from polyene or polyenes is preferably comprised between 0% and 4% and, more preferably, between about 0% and 3%.

The above indicated elastomeric copolymers of ethylene have intrinsic viscosities which are generally higher than 2.0 dl/g.

The analysis of the distribution of the propylene units has been carried out by $^{13}$C-NMR. The assignments have been carried out as described by M. Kakugo et al. in "Macromolecules 15, 1150–1152, (1982)". The distribution of the triads is calculated by the following relations:

$$EPE=T_{\delta\delta} \quad PPE=T_{\beta\delta} \quad PPP=T_{\beta\beta}$$

where EPE, PPE and PPP represent respectively the sequences ethylene/propylene/ethylene, propylene/propylene/ethylene and propylene/propylene/propylene in the copolymer. The values are normalized. The higher is the number of isolated propylene units in the chain, the nearer is to unity the value of the ratio EPE/(EPE+PPE+PPP).

The product of the reactivity ratios $r_1 \cdot r_2$, wherein $r_1$ is the reactivity ratio of propylene and $r_2$ is that of ethylene, is calculated according to the following formula:

$$r_1 \cdot r_2 = 1 + f \cdot (\chi+1) - (f+1) \cdot (\chi+1)^{1/2},$$

wherein f=ratio between the mols of ethylene units and the moles of propylene units in the copolymer, and $\chi$=(PPP+PPE)/EPE.

Other parameters obtainable from the distribution of the propylene units are the values B and M, which are calculated according to the following formulas:

B=4·EE·PP/EP$^2$

M=EEP$^2$·PPP·EPE/(PPE$^2$·EEE·PEP)

The ethylene\propylene elastomeric copolymers of the invention have B values generally lower than 0.5, and M values generally lower than 1.5.

Furthermore, by the process of the present invention it is possible to prepare elastomeric copolymers of ethylene with 1-butene and, optionally, one or more polyenes, having content of units deriving from ethylene comprised between about 35% and 85% by moles, content of units deriving from 1-butene comprised between about 10% and 60% by moles and content of units deriving from one or more polyenes comprised between 0 and 5% by moles, having the following characteristics:

content of 1-butene units in form of triad equal to 0;

product of the reactivity ratios $r_1 \cdot r_2$ higher than 0.1, preferably comprised between 0.1 and 1.0 and, more preferably, comprised between 0.2 and 0.4;

less than 2% and, preferably, less than 1% of the $CH_2$ groups in the polymeric chain contained in sequences $(CH_2)_n$ comprised between two tertiary carbon atoms, wherein n is an even number.

The content by moles of monomeric units deriving from ethylene is preferably comprised between about 50% and 80% and, more preferably, between about 60% and 75%.

The content by moles of monomeric units deriving from 1-butene is preferably comprised between about 15% and 50% and, more preferably, between about 20% and 40%.

The content by moles of monomeric units deriving from polyene or polyenes is preferably comprised between about 0% and 4% and, more preferably, between 0% and 3%.

The analysis of the distribution of the monomeric units of 1-butene has been carried out by $^{13}$C-NMR. The assignments have been carried out as described by J. C. Randall in "Macromolecules (1982), 15, 353–360". The spectrum is subdivided into the following eight areas:

(A1) from 40.0 to 38.9 ppm,
(A2) from 37.2 ppm,
(A3) from 34.8 to 34.16 ppm,
(A4) from 34.16 to 33.5 ppm,
(A5) from 31.0 to 29.0 ppm,
(A6) from 27.5 to 26.8 ppm,
(A7) from 26.8 to 26.5 ppm,
(A8) from 25.0 to 24.0 ppm.

The concentration (molar fraction) of diads is obtained by the following equations:

EE=0.5[A5+0.5(A6−A2)]/Z
EB=0.5[A1+A3+A4+0.5(A6−A2)+A8]/Z
BB=0.5(A2)/Z
with Z=0.5[A5+0.5(A6−A2)]+0.5[A1+A3+A4+0.5(A6−A2)+A8]+0.5(A2), wherein EE, EB and BB represent respectively the sequences ethylene/ethylene, ethylene/1-butene and 1-butene/1-butene in the copolymer.

The product of the reactivity ratios $r_1 \cdot r_2$, wherein $R_1$ is the reactivity ratio of 1-butene and $r_2$ that of ethylene, is calculated according to the following formula:

$$r_1 \cdot r_2 = 4(EE)(BB)/(EB)^2$$

wherein EE, BB and EB represent respectively the sequences ethylene/ethylene, butene/butene and ethylene/butene.

The elastomeric copolymers obtainable from the process of the invention are substantially free of crystallinity. Their melting enthalpy ($\Delta H_f$) is lower than about 20 J/g and, preferably, lower than 10 J/g. Generally, they can be considered completely amorphous, having non detectable melting enthalpies. However, the copolymers in which the content of units deriving from ethylene is close to the upper limit of 85% molar, have melting enthalpies which can be higher than 20 J/g.

The structure of the mentioned copolymers results to be highly regioregular. In fact, by the $^{13}$C-NMR analysis, signals relating to sequences $(CH_2)_n$ comprised between two tertiary carbon atoms, wherein n is an even number, are generally not detectable.

The elastomeric copolymers obtainable by the process of the present invention have intrinsic viscosities which are generally higher than 1.0 dl/g, preferably higher than 2.0 dl/g. However, by the process of the invention it is possible to obtain elastomeric copolymers of ethylene endowed with very high molecular weights.

It is therefore another object of the present invention an elastomeric copolymer of ethylene with at least one olefin of the formula (IX):

$$CH_2=CH-R \qquad (IX)$$

wherein R is an alkyl radical containing from 1 to 10 carbon atoms, and at least one polyene, having content of units deriving from ethylene comprised between about 35% and 85% by moles, content of units deriving from α-olefins comprised between about 10% and 60% by moles and content of units deriving from polyenes comprised between 0 and 5% by moles, having the following characteristics:

intrinsic viscosity higher than 6.0 dl/g, preferably higher than 8.0 dl/g and, more preferably, higher than 10.0 dl/g;

less than 2% and, preferably, less than 1% of $CH_2$ groups in the polymeric chain contained in sequences $(CH_2)_n$ comprised between two tertiary carbon atoms, wherein n is an even number.

The preferred α-olefin for this very high molecular weight elastomeric copolymer of ethylene is propylene.

These very high molecular weight elastomeric copolymers of ethylene have the advantage that they can be extended with large amounts of oil, much larger with respect to the amounts usually employed in the copolymers known at the date of the invention. Their very high molecular weights allows to obtain high strength properties in highly extended formulations.

According to a further interesting embodiment of the present invention, the very high molecular weight elastomeric copolymers of ethylene according to the invention have a very low content of cristallinity even when the content of units deriving from ethylene is as high as 85% by moles. In fact, the melting enthalpies of these copolymers are generally lower than 20 J/g, preferably lower than 15 J/g and, more preferably, lower than 10 J/g.

This fact is not at all expectable, since the known copolymers have much higher crystallinities at a parity of content of ethylenic units.

The elastomeric copolymers of ethylene according to the present invention are generally soluble in the common solvents such as, for example, hexane, heptane and toluene.

These copolymers can be vulcanized using formulation and methods known for EPM and EPDM rubbers, working, for example, in the presence of peroxides or of sulphur. Rubbers endowed with valuable elastomeric properties are obtained.

The rubbers obtained from the above mentioned copolymers can be transformed into manufactured articles by the generally used working process of thermoplastic materials (moulding, extrusion, injection, etc.). The relative manufactured articles are endowed of interesting elastic properties and are used in all the typical applications of alpha-olefinic elastomers.

In particular, the products obtained from copolymers having a high content of ethylene units can be advantageously used as coatings for wires and cables.

A further interesting use of the process of the invention is for the preparation of cycloolefin polymers. Monocyclic or polycyclic olefinic monomers can be either homopolymerized or copolymerized, also with non cyclic olefinic monomers.

Non limitative examples of cycloolefinic polymers which can be prepared by the process of the invention are described in European Patent Application EP-501,370 and EP-407,870, the content of which is incorporated in the present description.

The following examples are given to illustrate and not to limit the invention.

CHARACTERIZATIONS

The intrinsic viscosity [η] was measured in tetrahydronaphthalene at 135° C. Molecular weights ($M_v$) are calculated by the following equation:

$$[\eta] = 3.8 \cdot 10^{-4} M_v^{0.725}$$

The measurements of Differential Scanning Calorimetry (D.S.C.) were carried out on an instrument DSC-7 by Perkin Elmer Co. Ltd. according to the following method. About 10 mg of sample obtained from the polymerization were cooled to −25° C. and then heated to 200° C. with a scanning rate equal to 10° C./min. The sample was kept at 200° C. for 5 minutes and thereafter cooled with a scanning rate equal to 10° C./min. Thereafter, a second scanning was carried out according to the same modalities of the first one. The values reported are those obtained in the first scanning.

The $^{13}$C-N.M.R. analysis of the elastomeric copolymers have been carried out with a Bruker $AC_{200}$ instrument, at a temperature of 120° C., on samples prepared by dissolving about 300 mg of polymer in 2,5 cc of a 3:1 mixture of trichlorobenzene/$C_2D_2Cl_4$. The spectra have been registered with the following parameters:

Relaxation delay=12 sec
Number of scannings=2000÷2500

PREPARATION OF THE CATALYTIC COMPONENTS

MESO-ETHYLENE-BIS(4,7-DIMETHYL-INDENYL)ZIRCONIUM DICHLORIDE
(A) Preparation of 4,7-dimethylindene
The synthesis was carried out according to the method described in "Organometallics, 1990,9,3098" (yield 54% from p-xylene).

(B) Preparation of 1,2-bis(4,7-dimethyl-indenyl)ethane
38.2 g (265 mmol) of 4,7-dimethylindene were dissolved in 350 ml of tetrahydrofuran and the temperature of the solution was cooled to 0° C. Then, 165 ml of n-butyllithium (1.6M in hexane, 264 mmol) were added, dropwise for 2.5 hours. After having again heated up to room temperature and stirred the whole for 4 hours, a purple-red solution of 4,7-dimethylindenyl-lithium was obtained. This solution was cooled to −70° C. and treated, dropwise for 35 minutes, with 25.3 g of 1,2-dibromoethane (135 mmol) in 15 ml of tetrahydrofuran. After having heated up to room temperature, a slight yellow solution was obtained to which water was added. The organic phase was collected ed dried on $Na_2SO_4$. The solvent was then evaporated under vacuum and 20 g of product were obtained (yield 48%).

(C) Preparation of meso-ethylene-bis(4,7-dimethyl-1-indenyl)-zirconium dichloride
A suspension of 10 g of 1,2-bis(4,7-dimethyl-3-indenyl)-ethane (31.8 mmol) in 80 ml of tetrahydrofuran was added by a little pipe to a solution of 2.82 g of KH (70.3 mmol) in 160 ml of tetrahydrofuran, kept under stirring. After the formation of hydrogen ceased, the resulting brown solution was separated from excess KH. This solution and a solution of 12 g of $ZrCl_4(THF)_2$ (31.8 mmol) in 250 ml of tetrahydrofuran were added, dropwise for 3 hours, via cannula, to a round-bottomed flask containing 50 ml of tetrahydrofuran and kept under quick stirring. A yellow solution and a precipitate were formed. After having removed the solvent under vacuum, the yellow-orange residue (mixture of racemic and meso isomers in ratio 2.33:1 at the $^1$H-N.M.R. analysis) was subjected to extraction with $CH_2Cl_2$ until all the orange product was completely dissolved. 1.7 g (yield 11.3%) of a yellow solid was obtained, which at the $^1$H-N.M.R. analysis resulted consisting of the pure meso stereoisomer.

METHYLALUMOXANE (MAO)
A commercial product (WITCO) in a 30% b.w. toluene solution was used. After having removed the volatile fractions under vacuum, the vitreous material was ground until a white powder was obtained; this was further treated under vacuum (0.1 mm Hg) for 4 hours at the temperature of 40° C.

ISOSUTYLALUMOXANE (TIBAO)
A commercial product (WITCO) in 1.55M (on Al) cyclohexane solution was used.

EXAMPLE 1–5

Preparation of ethylene homopolymers

Into a 1 liter Büchi autoclave having glass body, provided with jacket, elicoidal stirrer and thermoresistance, and joined to a thermostat to control the temperature, washed with a solution of triisobutyl aluminum in n-hexane and dried in warm under anhydrous nitrogen stream, 0.4 1 of n-hexane (purified by passage on alumina columns) were introduced under nitrogen. The temperature was raised to a value of 7°–8° C. below the polymerization temperature and the nitrogen was substituted by ethylene.

The catalyst solution, using either MAO (a) or TIBAO (b) was prepared as follows.

(a) To a quantity of MAO toluene solution (10 mg/ml toluene) containing the required quantity of MAO, a quantity of a toluene solution of meso-ethylene-bis(4, 7-dimethyl-1-indenyl)zirconium dichloride (0.6 mg/ml toluene) containing the required quantity of metallocene was added and the whole was kept at room temperature for 10 minutes.

(b) To a solution containing TIBAO (1 mmol of Al) in 10 ml of toluene, a quantity of a toluene solution of meso-ethylene-bis-(4,7-dimethyl-1-indenyl)zirconium dichloride in toluene (0.6 mg/ml toluene) containing the required quantity of metallocene was added and the whole was kept at room temperature for 5 minutes.

The solution was injected into the autoclave by a slight ethylene overpressure. The temperature and pressure were then raised to the value required for the polymerization and kept constant for all the duration of the polymerization. The pressure was kept constant by supplying ethylene. The reaction was then ceased by removing the ethylene overpressure and injecting a little quantity of methanol. The polymer obtained was dried in oven at 60° C. under nitrogen stream.

The polymerization conditions and the data relating to the characterizations on the obtained polymers are reported in Table 1.

EXAMPLE 6

Preparation of an ethylene/1-butene copolymer

A 2.5 l steel autoclave equipped with a blade magnetic stirrer, manometer, temperature indicator, system for loading the catalyst, feed line for the monomer and a thermostating jacket, was purged through propane washing at 70° C. 1260 ml of propane, and the amounts of ethylene and 1-butene reported in Table 2 were introduced at room temperature and then the reactor was heated to 45° C. The catalytic suspension was prepared in a Schlenck tube with a discharge tap at the bottom. 4.2 mmols of MAO in 5 ml of toluene was added at a temperature of 25° C. and followed by 1.0 mg of meso-ethylene-bis(4,7-dimethyl-1-indenyl)zirconium dichloride. The reagents were contacted for 5 minutes and then the suspension was introduced into the autoclave by ethylene overpressure. The temperature was then raised to 50° C. and maintained constant during the polymerization. The total pressure was kept constant by feeding a mixture of ethylene/1-butene. The polymerization was interrupted by introducing 0.6 NL of CO into the autoclave after rapid cooling to 30° C. The reactor was then left to slowly degas and the polymer obtained was dried at 60° C. under vacuo.

The polymerization conditions and the data relating to the characterization of the obtained polymer are reported in Table 2.

EXAMPLE 7

Preparation of an ethylene/1-butene copolymer

It was worked according to the procedure described in example 6, but using triisobutyl aluminum (WITCO) instead of MAO, and introducing 2.1 mmoles of $H_2O$ into the autoclave before the introduction of propane.

The polymerization conditions and the data relating to the characterization of the obtained polymer are reported in Table 2.

EXAMPLE 8

Preparation of an ethylene/1-butene copolymer

It was worked according to the procedure described in example 6, but introducing 0.7 bar of hydrogen into the autoclave.

The polymerization conditions and the data relating to the characterization of the obtained polymer are reported in Table 2.

EXAMPLES 9–10

Preparation of ethylene/propylene elastomeric copolymers in solution polymerization Into a 4.25 liter stainless steel autoclave, provided with stirrer, manometer, temperature indicator, system for the supplying of the catalyst, feeding lines for monomers and thermostating jackets, degased by washing with ethylene at 80° C., 2 liters of n-hexane (measured at 20° C.) and the quantities of propylene and ethylene reported in Table 3 were introduced at room temperature. The temperature of the autoclave was then rised to 5° C. below the polymerization temperature. The solution of the catalyst was prepared as follow. To a toluene solution of meso-ethylene-bis(4,7-dimethyl-1-indenyl)zirconium dichloride (3 ml toluene/mg metallocene), a methylalumoxane (MAO) solution in 10 ml of toluene was added. The whole was kept stirred at the temperature of 20° C. for 5 minutes, then the solution was injected into the autoclave under pressure of ethylene/propylene mixture in such a ratio to maintain in solution the above reported corresponding concentration. The temperature was then quickly raised to the value required for the polymerization. The polymerization conditions are reported in Table 3. The polymer obtained was separated by removing the solvent and the unreacted monomers and then dried under vacuum. The data relating to the characterization of the obtained polymers are reported in Table 4. In the $^{13}$C-NMR no peak revealing the presence of sequences —$(CH_2)_n$— comprised between two tertiary carbon atoms, wherein n is an even number, was observed.

EXAMPLES 11–13

Preparation of ethylene/propylene elastomeric copolymers in slurry polymerization It was worked according to the procedure described in examples 9–10, but operating with lower amounts of n-hexane. The polymerization conditions are reported in Table 3. The data relating to the characterization of the obtained polymers are reported in Table 4.

EXAMPLE 14

Preparation Of an ethylene/1-butene elastomeric copolymer in solution polymerization It was worked according to the procedure described in examples 9–10, but using 1-butene instead of propylene. The polymerization conditions are reported in Table 3. The data relating to the characterization of the obtained polymer are reported in Table 5. In the $^{13}$C-NMR spectrum no peak revealing the presence of sequences —$(CH_2)_n$— comprised between two tertiary carbon atoms, wherein n is an even number, was observed.

TABLE 1

| Example | Zr (mmoles · $10^{-3}$) | Al type | Al mmoles | Total P (bar) | T (°C.) | Time (min) | Yield (g) | Activity (Kg$_{pol}$/g$_{Zr}$) | [η] (dl/g) | $M_T$ (g/moles · $10^6$) |
|---|---|---|---|---|---|---|---|---|---|---|
| 1 | 0.2 | TIBAO | 1 | 4 | 50 | 60 | 1.3 | 70.9 | 21.2 | 3.5 |
| 2 | 0.2 | MAO | 1 | 4 | 50 | 60 | 4.2 | 226.8 | 19.0 | 3.0 |
| 3 | 0.2 | MAO | 1 | 5.5 | 70 | 60 | 7.5 | 406.3 | 13.9 | 2.0 |
| 4 | 1.0 | TIBAO | 1 | 5.5 | 70 | 60 | 10.6 | 115.2 | 15.1 | 2.2 |
| 5 | 1.0 | MAO | 1 | 5.5 | 70 | 60 | 10.0 | 110.4 | 12.9 | 1.8 |

TABLE 2

| Example | Cocatalyst type | Cocatalyst mmoles | 1-butene (ml) | Ethylene partial pressure (bar) | Hydrogen partial pressure (bar) | Time | Yield (g) | Activity (Kg/gZr/h) | 1-butene (% weight) | I.V. (dl/g) | $T_m$ (°C.) | ΔH (J/g) |
|---|---|---|---|---|---|---|---|---|---|---|---|---|
| 6 | MAO | 4.2 | 354 | 16.5 | — | 120 | 65 | 169.0 | 20.1 | 9.0 | — | — |
| 7 | TIBAL/$H_2O$ | 4.2 | 354 | 16.5 | — | 240 | 46 | 59.8 | 10.1 | 13.6 | — | — |
| 8 | MAO | 4.2 | 378 | 17.1 | 0.7 | 120 | 180 | 468.1 | 14.6 | 1.7 | 89 | 72 |

TABLE 3

| Example | Zr (mmoles · 10⁻³) | Al (mmoles) | C₂ liquid phase (grams) | C₂ liquid phase (% weight) | α-olefin liquid phase (grams) | α-olefin liquid phase (% weight) | total P (bar) | T (°C.) | time (min) | yield (g) | Activity (Kg$_{pol}$/g$_{Zr}$) |
|---|---|---|---|---|---|---|---|---|---|---|---|
| 9  | 2.1 | 4.38  | 27.4  | 1.4  | 429.3 | 24.2  | 8.5  | 50 | 60  | 96  | 499.5  |
| 10 | 2.1 | 4.38  | 17.8  | 0.91 | 427.4 | 24.2  | 7.7  | 50 | 40  | 88  | 457.9  |
| 11 | 4.2 | 4.2   | 62.1  | 5.0  | 800   | 65.0  | 13.2 | 30 | 54  | 334 | 868.9  |
| 12 | 2.1 | 4.2   | 101.2 | 7.82 | 800   | 61.8  | 15.1 | 30 | 83  | 272 | 1415.2 |
| 13 | 1.1 | 4.2   | 122.8 | 9.2  | 800   | 60.1  | 17.9 | 35 | 120 | 218 | 1134.2 |
| 14 | 4.2 | 4.378 | 48.4  | 3.54 | 1000  | 96.46 | 9.0  | 50 | 15  | 187 | 468.7  |

TABLE 4

| Example | propylene (% moles) | N.M.R. EPE | N.M.R. PPE | N.M.R. PPP | N.M.R. PPP/(EPE + PPE + PPP) | % iso | r₁r₂ | B | M | I.V. (dl/g) | D.S.C. I scans. T₁ (°C.) | D.S.C. I scans. ΔH_t (J/g) |
|---|---|---|---|---|---|---|---|---|---|---|---|---|
| 9  | 30.7 | 0.216 | 0.083 | 0.007 | 0.024 | 33 | 0.324 | 0.35 | 0.82 | 4.1   | 42.5      | 1.5  |
| 10 | 33.2 | 0.220 | 0.100 | 0.008 | 0.024 | 37 | 0.330 | 0.28 | 0.63 | 3.7   | —         | —    |
| 11 | 31.7 | n.d.  | n.d.  | n.d.  | n.d.  | n.d. | n.d. | n.d. | n.d. | 6.1   | 43.3      | 0.4  |
| 12 | 25.7 | n.d.  | n.d.  | n.d.  | n.d.  | n.d. | n.d. | n.d. | n.d. | 11.33 | 41.9      | 4.9  |
| 13 | 26.7 | n.d.  | n.d.  | n.d.  | n.d.  | n.d. | n.d. | n.d. | n.d. | 12.36 | 21.0/37.8 | 13.0 | n.d. = not determined

TABLE 5

| Example | 1-butene (% moli) | N.M.R. BB | N.M.R. EB | N.M.R. EE | N.M.R. BB/(BB + EB + EE) | BBB | r₁r₂ | I.V. (dl/g) | D.S.C. I scans. T₁(°C.) | D.S.C. I scans. ΔH_t (J/g) |
|---|---|---|---|---|---|---|---|---|---|---|
| 14 | 27.2 | 2.68 | 49.0 | 48.3 | 0.0985 | 0 | 0.23 | 6.0 | — | — |

What is claimed is:

1. A process for the preparation of an ethylene homopolymer, a copolymer of ethylene with alpha-olefins having the formula CH₂=CH—R, wherein R is an alkyl radical containing from 1 to 20 carbon atoms, or a copolymer of ethylene with alpha-olefins and polyenes, which comprises the polymerization reaction of ethylene, the copolymerization reaction of ethylene with alpha-olefins, or the copolymerization reaction of ethylene with alpha-olefins and polyenes, in the presence of a catalyst comprising a stereorigid metallocene compound of a transition metal belonging to Group IIIb, IVb, Vb, VIb or the Lanthanide series of the Periodic Table of the Elements, the metallocene compound having two substituted cyclopentadienyl ligands, the substituents and the substitution patterns on the cyclopentadienyl ligands being identical, the cyclopentadienyl ligands being linked by a bridging group which gives the metallocene compound steric rigidity, and wherein all metallocene compounds in the catalyst are in a form consisting essentially of meso isomeric metallocene compounds.

2. The process according to claim 1, wherein the metallocene compound is represented by the formula (I):

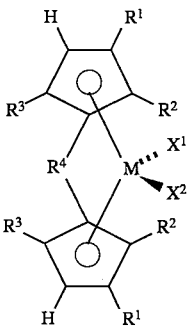

wherein
(i) M is a metal selected from the group consisting of Ti, Zr and Hf;
(ii) the R¹ moieties are selected from the group consisting of C₁–C₂₀ alkyl radicals, C₃–C₂₀ cycloalkyl radicals, C₂–C₂₀ alkenyl radicals, C₆–C₂₀ aryl radicals, C₇–C₂₀ alkylaryl radicals and C₇–C₂₀ arylalkyl radicals, each of which optionally contains Si or Ge atoms;
(iii) the R² moieties are selected from the group consisting of hydrogen atoms, C₁–C₂₀ alkyl radicals, C₃–C₂₀ cycloalkyl radicals, C₂–C₂₀ alkenyl radicals, C₆–C₂₀ aryl radicals, C₇–C₂₀ alkylaryl radicals and C₇–C₂₀ arylalkyl radicals, each of which optionally contains Si or Ge atoms;
(iv) the R³ moieties are selected from the group consisting of hydrogen atoms, C₁–C₂₀ alkyl radicals, C₃–C₂₀ cycloalkyl radicals, $C_2$–$C_{20}$ alkenyl radicals, $C_6$–$C_{20}$ aryl radicals, $C_7$–$C_{20}$ alkylaryl radicals and $C_7$–$C_{20}$ arylalkyl radicals, each of which optionally contains Si or Ge atoms;

(v) $R^4$ is a divalent group selected from $(CR^5_2)_n$, $(SiR^5_2)_n$, $(GeR^5_2)_n$, $NR^5$ or $PR^5$, wherein $R^5$, same or different, are $C_1$–$C_{20}$ alkyl radicals, $C_3$–$C_{20}$ cycloalkyl radicals, $C_2$–$C_{20}$ alkenyl radicals, $C_6$–$C_{20}$ aryl radicals, $C_7$–$C_{20}$ alkylaryl radicals or $C_7$–$C_{20}$ arylalkyl radicals, and when $R^4$ is $(CR^5_2)_n$, $(SiR^5_2)_n$, or $(GeR^5_2)_n$, two substituents $R^5$ on the same carbon, silicon or germanium atom can form a cycle comprising from 3 to 8 atoms;

(vi) n is an integer comprised between 1 and 4;

(vii) $X^1$ and $X^2$, same or different, are hydrogen atoms, halogen atoms, $R^6$, $OR^6$, $SR^6$, $NR^6_2$ or $PR^6_2$, wherein substituents $R^6$, same or different from each other, are $C_1$–$C_{20}$ alkyl radicals, $C_3$–$C_{20}$ cycloalkyl radicals, $C_2$–$C_{20}$ alkenyl radicals, $C_6$–$C_{20}$ aryl radicals, $C_7$–$C_{20}$ alkylaryl radicals or $C_7$–$C_{20}$ arylalkyl radicals, each of which optionally contains Si or Ge atoms;

(viii) and wherein $R^1$ and $R^2$ on each cyclopentadienyl ligand can form a cycle comprising from 5 to 8 carbon atoms;

wherein the polymerization is conducted in the presence of a cocatalyst.

3. The process according to claim 2, wherein the metallocene compound is represented by the formula (II):

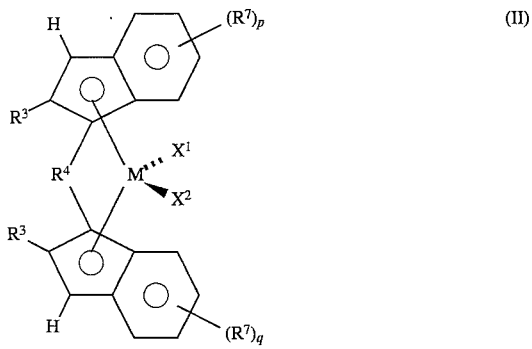

wherein (i) M, $R^3$, $R^4$, $X^1$, and $X^2$ are defined as in claim 2;

(ii) the $R^7$ moieties, same or different, are selected from the group consisting of hydrogen atoms, $C_1$–$C_{10}$ alkyl radicals, $C_3$–$C_{10}$ cycloalkyl radicals, $C_2$–$C_{10}$ alkenyl radicals, $C_6$–$C_{10}$ alkylaryl radicals or $C_7$–$C_{10}$ arylalkyl radicals, each of which optionally contains Si or Ge atoms, the substituents and the substitution patterns on the phenyl rings being identical;

(iii) p and q are the same and are integers comprised between 1 and 4;

(iv) and wherein two adjacent substituents $R^7$ on the same ligand can form a cycle comprising from 5 to 8 carbon atoms.

4. The process according to claim 3, wherein the metallocene is ethylene-bis(4,7-dimethyl-1-indenyl)zirconium dichloride.

5. The process according to claim 2, wherein the metallocene compound is represented by the formula (III):

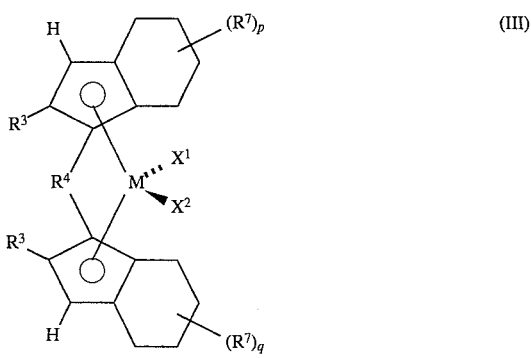

wherein (i) M, $R^3$, $R^4$, $X^1$, and $X^2$ are defined as in claim 2;

(ii) the $R^7$ moieties, same or different, are selected from the group consisting of hydrogen atoms, $C_1$–$C_{10}$ alkyl radicals, $C_3$–$C_{10}$ cycloalkyl radicals, $C_2$–$C_{10}$ alkenyl radicals, $C_6$–$C_{10}$ alkylaryl radicals or $C_7$–$C_{10}$ arylalkyl radicals, each of which optionally contains Si or Ge atoms, the substituents and the substitution patterns on the cyclohexyl rings being identical;

(iii) p and q are the same and are integers comprised between 1 and 4;

(iv) and wherein two adjacent substituents $R^7$ on the same ligand can form a cycle comprising from 5 to 8 carbon atoms.

6. The process according to claim 2, wherein n is 1 or 2.

7. The process according to claim 1, wherein the catalyst comprises at least one compound selected from the group consisting of organometallic compounds of aluminum and the compounds able to form a metallocene alkyl cation.

8. The process according to claim 7, wherein the organometallic compound of aluminum is a linear, branched or cyclic alumoxane, containing at least one group of the type (IV):

wherein $R^8$, same or different, are $R^9$ or a group —O—Al$(R^8)_2$ and, optionally, some can be halogen atoms, $R^9$ being defined as $R^1$.

9. The process according to claim 1, wherein the polymerization reaction is carried out in the presence of at least one alpha-olefin having the formula $CH_2\!\!=\!\!CH\text{—}R$, wherein R is an alkyl radical containing from 1 to 10 carbon atoms, and wherein the copolymer produced is an elastomeric copolymer of ethylene.

10. The process according to claim 9, wherein the polymerization is carried out in the presence of minor amounts of a polyene.

* * * * *

UNITED STATES PATENT AND TRADEMARK OFFICE
CERTIFICATE OF CORRECTION

PATENT NO. : 5,585,448

DATED : December 17, 1996

INVENTOR(S): Luigi Resconi

It is certified that error appears in the above-identified patent and that said Letters Patent is hereby corrected as shown below:

Column 15, Line 65: Delete "mesc" Insert -- meso --

Column 18, Line 48: Insert -- $R^8$ -- after some

Signed and Sealed this

First Day of April, 1997

BRUCE LEHMAN

Attest:

Attesting Officer

Commissioner of Patents and Trademarks